United States Patent [19]
Gatlin

[11] Patent Number: 5,626,478
[45] Date of Patent: May 6, 1997

[54] PORTABLE COACHING DEVICE AND METHOD

[76] Inventor: Gray Gatlin, 2701 Lorenzo Ave., Costa Mesa, Calif. 92626

[21] Appl. No.: 549,621

[22] Filed: Oct. 27, 1995

[51] Int. Cl.$^6$ .............................. A63B 69/00; G09B 19/00
[52] U.S. Cl. .................. 434/247; 434/251; 434/408; 434/415
[58] Field of Search ................ 434/85, 247, 408, 434/415, 416, 421, 422, 429, 430, 243, 251

[56] References Cited

U.S. PATENT DOCUMENTS

| | | | |
|---|---|---|---|
| 288,698 | 11/1883 | Emack | 434/422 |
| 723,022 | 3/1903 | Pratt | 434/429 |
| 819,847 | 5/1906 | Bullard | 434/416 |
| 1,087,336 | 2/1914 | Thurber | 434/430 |
| 3,363,341 | 1/1968 | Glassman | 434/421 |
| 3,949,132 | 4/1976 | Seregely et al. | 434/408 |
| 4,696,400 | 9/1987 | Warman | 434/89 |
| 4,813,711 | 3/1989 | Bohlman | 434/408 |
| 4,858,955 | 8/1989 | Hoh | 434/84 |
| 5,035,626 | 7/1991 | Persing | 434/408 |
| 5,137,453 | 8/1992 | Hudson | 434/415 |
| 5,163,845 | 11/1992 | Blassingame | 434/297 |
| 5,263,866 | 11/1993 | Campbell | 434/247 |
| 5,324,202 | 6/1994 | Meyers et al. | 434/415 |

*Primary Examiner*—Paul J. Hirsch
*Attorney, Agent, or Firm*—John J. Connors; Connors & Assoc.

[57] ABSTRACT

The portable coaching device includes a thin, rigid support board having opposed sides and a perimeter. One side is covered with a white coating capable of being written upon with a dry erase marker and the other side bears an image of an area in which a game is played. This image is protected by a material which is capable of being written upon with a dry erase marker. There is handle in the form of an elongated opening near the perimeter of the board, and a case adapted to hold a dry erase marker attached to the board.

20 Claims, 2 Drawing Sheets

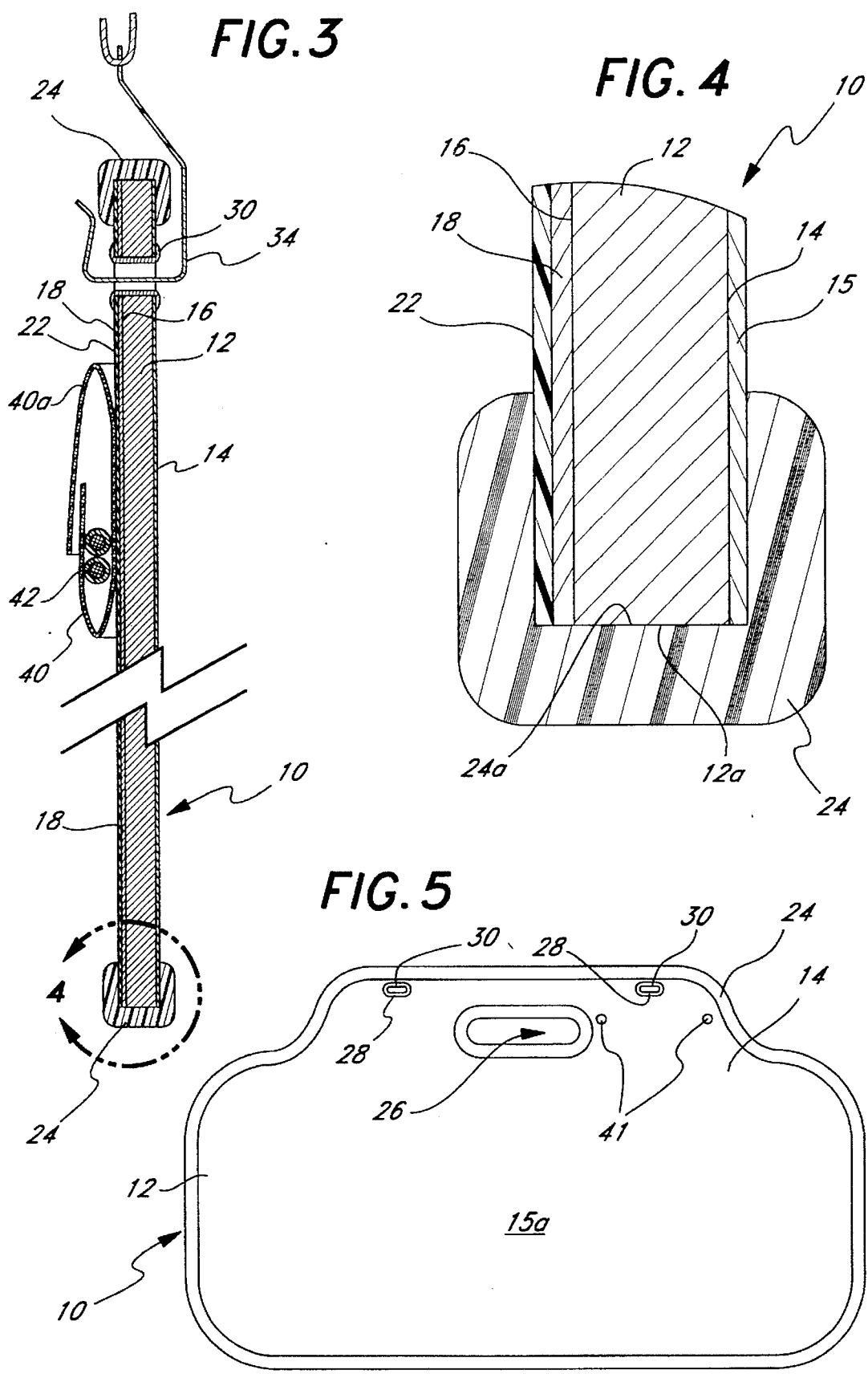

PORTABLE COACHING DEVICE AND METHOD

BACKGROUND OF THE INVENTION

1. Field of the Invention

This invention relates to a coaching device. In particular to a coaching device comprising a board having a surface which bears an image of the area on which a game is to be played, such as a hockey rink, football field, basketball court, baseball field, soccer field, etc. This surface of the board may be written upon with a dry erase marker so that the writing may be easily removed and the surface reused.

2. Background Discussion

It is well known that athletic coaches use blackboards to depict certain plays. In hockey, football, baseball, soccer, basketball, and the like, various player positions are illustrated, and instructions for executing plays and practice drills are drawn by the coach to illustrate where the players should move on the playing area. In many instances, these boards are not portable. It is highly desirable that a portable device be provided that is durable, easy to use, particularly to erase, and be especially useful as an instructional tool.

SUMMARY OF THE INVENTION

It is the objective of this invention to provide a portable coaching device in the form of a board which is lightweight, durable, and portable and has a surface depicting a playing area which may be written upon with a dry erase marker, with the writing being easily removed by simply rubbing it.

The portable coaching device of this invention has several features, no single one of which is solely responsible for its desirable attributes. Without limiting the scope of this invention as expressed by the claims which follow, its :more prominent features will now be discussed briefly. After considering this discussion, and particularly after reading the section entitled, "DETAILED DESCRIPTION OF THE PREFERRED EMBODIMENTS," one will understand how the features of this invention provide its benefits, which include portability, durability, lightness, two writing surfaces, one on each side of the board, a case for markers, and one of the surfaces depicting a playing area with all game lines and other regulation designations displayed.

The first feature of the portable coaching device of this invention is that it includes a thin, rigid support board having opposed sides and a perimeter with an exposed edge. Preferably, the board has a generally rectangular shape, and the rectangular shaped board preferably has corners which are rounded. Typically, the board has a length of from 23 to 38 inches, a width of from 20 to 22 inches, and a thickness of from ¼ to ⅝ inch.

The second feature is that one side of the board is covered with a coating, preferably white, and the other side is covered with a sheet having a surface bearing an image of an area in which a game is played, including lines defining boundaries of the playing area and other regulation designations displayed within the playing area. For example, image of the playing area may depict a hockey rink, a football field, a basketball court, a soccer field, a baseball field, etc. The lines defining boundaries of the playing area and other regulation designations may be printed in color to correspond with the regulation colors. Moreover, the surface of the playing area may be printed the color green to simulate grass. A sheet of transparent polymeric material covers and protects this printed surface of the sheet and it is bonded by an adhesive to the surface. The white coating and the sheet of transparent polymeric material are capable of being written upon with a dry erase marker.

The third feature is a handle in the form of an elongated opening in the board near the perimeter of the board. The opening preferably is centrally located along one side of the perimeter. Both the perimeter of the board and the perimeter of the opening have an exposed edge. These edges are covered with boarder elements attached to the board to cover the exposed edges. These boarder elements are flexible so that they may be bent to conform them to the shape of the exposed edges of the board or opening, as the case may be. Preferably, these boarders elements have a generally U-shape configuration that provides a recess which receives the exposed opening edge.

The fourth feature is that there are a pair of holes in the board, one hole on each side of the opening. The holes are adapted to receive straps for supporting the device in a generally vertical orientation.

The fifth feature is a case adapted to hold one or more dry erase marker attached to the board near the perimeter of said board, outside of the playing area.

This invention also includes a method of teaching a game. This method comprises the following steps:

(a) providing a portable coaching device, including a thin, rigid support board having opposed sides and a perimeter, with one side covered with a coating capable of being written upon with a dry erase marker and the other side bearing an image of an area in which the game is played, said image being protected by a material which is capable of being written upon with a dry erase marker, a handle in the form of an elongated opening near the perimeter of said board, and a case adapted to hold a dry erase marker attached to the board, (b) using a dry erase marker to write on the surface bearing the image of the area in which the game is played to illustrate ways to play the game, and (c) periodically erasing said surface and storing the dry erase marker in the case.

DESCRIPTION OF THE DRAWING

The preferred embodiment of this invention, illustrating all its features, will now be discussed in detail. This embodiment depicts the novel and non-obvious portable coaching device and method of this invention as shown in the accompanying drawing, which is for illustrative purposes only. This drawing includes the following figures (FIGS.), with like numerals indicating like parts:

FIG. 3 is a cross-sectional view taken along line 3—3 of FIG. 1.

FIG. 4 is an enlarged, fragmentary cross-sectional view taken along line 4 of FIG. 3.

FIG. 5 is a rear side-elevational view of the coaching device shown in FIG. 1.

DETAILED DESCRIPTION OF THE PREFERRED EMBODIMENTS

Figure 2:
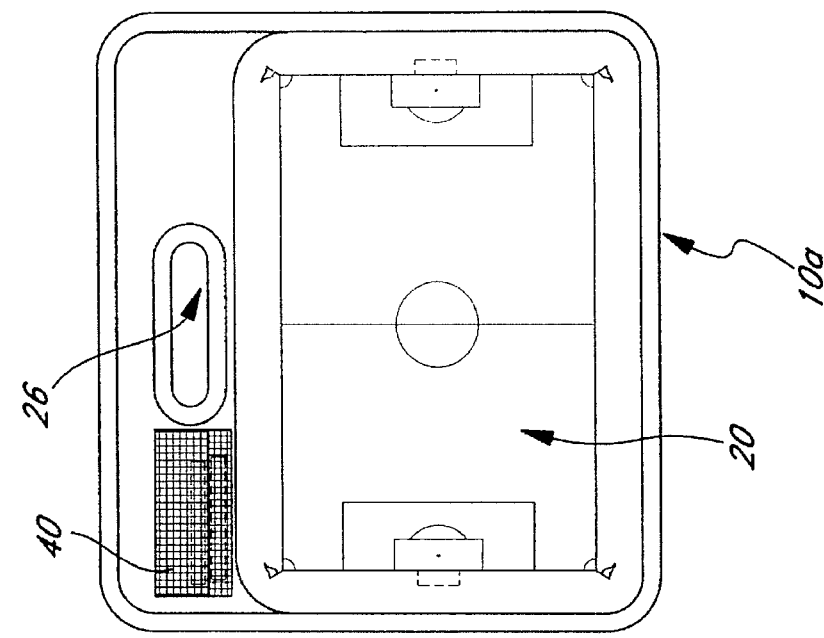
FIG. 2 is a plan view of an alternate embodiment of the coaching device of this invention showing a soccer field depicted on one surface of the coaching device.
Figure 1:
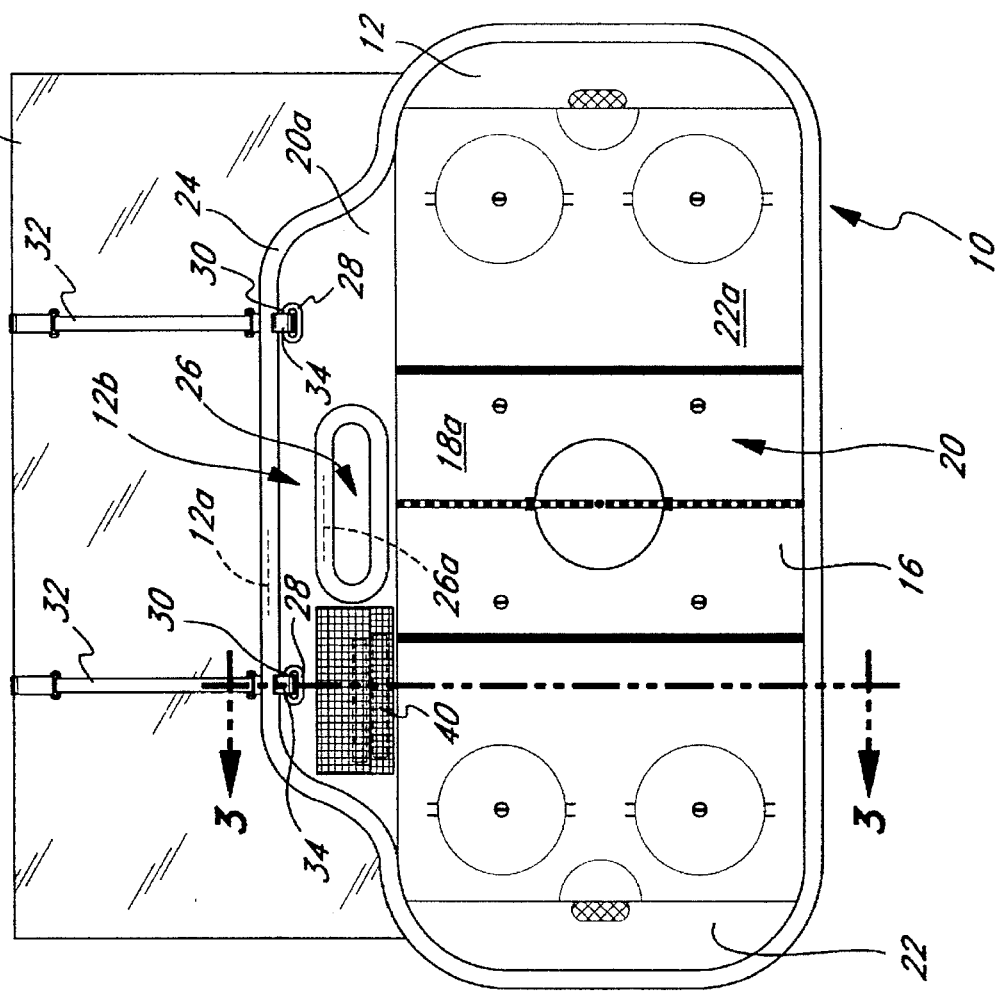
FIG. 1 is a front side-elevational view of one embodiment of the coaching device of this invention, hanging from a plexiglass shield commonly used in the vicinity of hockey rinks.

As best shown in FIGS. 1 and 2, the coaching device 10 of this invention comprises a generally rectangular board 12 having one side 14 (FIG. 5) coated with a layer 15 (FIG. 4) of white paint, and another side 16 carrying a printed paper sheet 18 (FIG. 4), which has the image of the playing area 20 of a game depicted on its surface. As illustrated in FIG. 5, the layer 15 of white paint provides a smooth white surface 15a which may be written upon using a dry erase marker. As illustrated in FIG. 4, the printed paper sheet 18 is glued to the one side 16 of the board 12, and the sheet's printed surface 18a is covered with a sheet 22 of transparent, polymeric material. The polymeric sheet 22 has a smooth external surface 22a which may be written upon using a dry erase marker. Both the surface 22a and surface 15a may be easily erased by simply wiping the dry erase marking material from these surfaces using a dry cloth.

The board 12 has a thickness of about one quarter inch, and is made from a hard, durable material. A suitable board 12 is sold under the trademark ABTCO Aquatile flat tile board manufactured by ABTco, Inc. of Troy, Mich. This board 12 has smooth surfaces which are finished with a hard, durable, water-resistant coating. The preferred polymeric sheet 22 comprises a film of polypropylene having its underside coated with a fresh, clear, pressure-sensitive, acrylic adhesive backed with a poly-coated kraft release liner (not shown). The liner is removed to expose the adhesive prior to placing the transparent, polymeric sheet 22 over the printed surface 18a of paper sheet 18.

The device 10 illustrated in FIGS. 1 and 5 is designed for coaching hockey. It has employs a board 12 having a generally rectangular configuration with a width of about 16 inches and a length of about 32 inches. A hockey rink (the area 20) with all the lines defining boundaries of the playing area and other regulation designations is depicted on the printed sheet 18. There are holes 28 on each side of the opening 26 fitted with brass grommets 30 (FIG. 3) that allows straps 32 with hooks 34 to be removably attached to the device 10. Thus, the device 10 may be hung on a sheet of plexiglass 36, as shown in FIG. 1, so that the coach may use the device 10 during the course of a hockey game.

As shown in FIG. 1, there is an elongated opening 26 along and adjacent to the perimeter edge 12a of the board 12 in a zone 20a immediately adjacent to the playing area 20. The distance between the perimeter's edge 12a and the opening 26 does not exceed about 2½ inches. This enables the user to pass the user's fingers through the opening 26, with the user's thumb wrapped around the board section 12b between the opening 26 and the perimeter's edge 12a. This edge 12a, as well as the edge 26a of the opening 26, is rough. These rough edges 12a and 26a would be exposed, but for a flexible border element 24 which surrounds these edges and covers them.

A suitable border element 24 is sold under the trade name Stanpro long leg, single lip trim, Part No. 75000339, by The Standard Products Co. of Dearborn, Mich. This border element 24 comprises a series of generally U-shaped, metallic elements (not shown) connected together is series and embedded in a vinyl polymer. The border element 24 has a generally U-shaped cross-section that provides a recess 24a into which the exposed edge 12a and 26a are inserted. Edge 12a is shown in FIG. 4 inserted into the recess 24a.

There is a case 40 made of flexible, polymeric webbing secured by rivets 41 (FIG. 5) to the board 12 and located in the zone 20a adjacent to the playing area 20. This case 40 has a lid 40a which may be opened to grasp a dry erase marker 42 contained in the case. The case illustrated has the capacity to hold a number of markers 42.

The dimensions of the board 12 will be varied, depending upon the nature of the game for which the device 10 is designed to depict. As shown in FIG. 2, an alternate embodiment of this invention is illustrated, device 10a, where the board 12 has a square rectangular configuration, with the corners rounded. On this device 10a, a soccer field is depicted. This device 10a does not include the openings 30 on either side of the opening 26, but it does have the border element 24 wrapped about the edge of the board, as well as the internal edge of the opening.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention.

I claim:

1. A portable coaching device, including
   a thin, rigid support board having opposed sides and a perimeter with an exposed edge,
   one side covered with a coating and the other side covered with a sheet having a surface bearing an image of an area in which a game is played, including lines defining boundaries of the playing area and other regulation designations displayed within the playing area,
   a sheet of transparent polymeric material covering the surface of said sheet and bonded by an adhesive to said surface,
   a border element that is attached to the perimeter to cover said exposed edge, said border element being flexible and bent to conform said border element to the shape of said edge,
   said coating and the sheet of transparent polymeric material being capable of being written upon with a dry erase marker,
   a handle in the form of an elongated opening near the perimeter of said board, and
   a case adapted to hold a dry erase marker attached to the board near the perimeter of said board.

2. The coaching device of claim 1 where the board has a generally rectangular shape.

3. The coaching device of claim 2 where the rectangular shaped board has corners which are rounded.

4. The coaching device of claim 1 where the board has a length of from 23 to 28 inches, a width of from 20 to 22 inches, and a thickness of from ¼ to ⅝ inch.

5. The coaching device of claim 1 where the border element has a generally U-shape configuration that provides a recess which receives the exposed edge.

6. The coaching device of claim 1 where the opening has an exposed edge, said exposed opening edge having a second boarder element attached to the board to cover said exposed opening edge, said second border element being flexible so that said second border element may be bent to conform it to the shape of said exposed opening edge.

7. The coaching device of claim 6 where the second boarder element has a generally U-shape configuration that provides a recess which receives the exposed opening edge.

8. The coaching device of claim 1 where the opening is centrally located along one side the perimeter of the board.

9. The coaching device of claim 1 where there are a pair of holes in the board, one hole on each side of the opening, said holes being adapted to receive straps for supporting the device in a generally vertical orientation.

10. The coaching device of claim 1 where the image of the game area depicts a hockey rink.

11. The coaching device of claim 1 where the image of the game area depicts a football field.

12. The coaching device of claim 1 where the image of the game area depicts a basketball court.

13. The coaching device of claim 1 where the image of the game area depicts a soccer field.

14. The coaching device of claim 1 where the image of the game area depicts a baseball field.

15. A portable coaching device, including a thin, rigid, generally rectangular support board having opposed sides and a perimeter with an exposed edge, one side covered with a coating and the other side covered with a sheet having a surface bearing an image of an area in which a game is played, including lines defining boundaries of the playing area and other regulation designations displayed within the playing area, said board having a length of from 23 to 28 inches, a width of from 20 to 22 inches, and a thickness of from ¼ to ⅝ inch, a sheet of transparent polymeric material covering the surface of said sheet and bonded by an adhesive to said surface, a first border element that is attached to the perimeter to cover said exposed perimeter edge, said first border element being flexible so that said border element is bent to conform it to the shape of said perimeter edge, said coating and the sheet of transparent polymeric material being capable of being written upon with a dry erase marker, a handle near the perimeter of said board in the form of an elongated opening centrally located along one side the perimeter of the board, said opening having an exposed edge, a second boarder element attached to said exposed opening edge to cover said exposed opening edge, said second border element being flexible and bent to conform said second border element to the shape of said exposed opening edge, and a case adapted to hold a dry erase marker attached to the board near the perimeter of said board.

16. The coaching device of claim 15 where the rectangular shaped board has corners which are rounded.

17. The coaching device of claim 15 where the first and second boarder elements each have a generally U-shape configuration that provides a recess which receives an exposed edge.

18. The coaching device of claim 15 where there are a pair of holes in the board, one hole on each side of the opening, said holes being adapted to receive straps for supporting the device in a generally vertical orientation.

19. A portable coaching device, including a thin, rigid support board having opposed sides and a perimeter with an exposed edge, with one side covered with a coating capable of being written upon with a dry erase marker and the other side bearing an image of an area in which a game is played, said image being protected by a material which is capable of being written upon with a dry erase marker, a border element that is attached to the perimeter to cover said exposed edge, said border element being flexible and bent to conform said border element to the shape of said edge, said boarder element having a generally U-shape configuration that provides a recess which receives the exposed edge, and a handle for carrying the board.

20. The method of teaching a game, comprising (a) providing a portable coaching device, including a thin, rigid support board having opposed sides and a perimeter with an exposed edge, with one side covered with a coating capable of being written upon with a dry erase marker and the other side bearing an image of an area in which the game is played, said image being protected by a material which is capable of being written upon with a dry erase marker, a border element that is attached to the perimeter to cover said exposed edge, said border element being flexible and bent to conform said border element to the shape of said edge, said boarder element having a generally U-shape configuration that provides a recess which receives the exposed edge, and a handle in the form of an elongated opening near the perimeter of said board, and a case adapted to hold a dry erase marker attached to the board, (b) using a dry erase marker to write on the surface bearing the image of the area in which the game is played to illustrate ways to play the game, and (c) periodically erasing said surface and storing the dry erase marker in the case.

* * * * *